Jan. 29, 1963     O. SHAMES ET AL     3,076,190
AIR-TO-AIR RANGING SYSTEM

Filed June 30, 1960     4 Sheets-Sheet 1

INVENTORS
OSCAR SHAMES
KEITH L. JEROME
BY
ATTORNEY

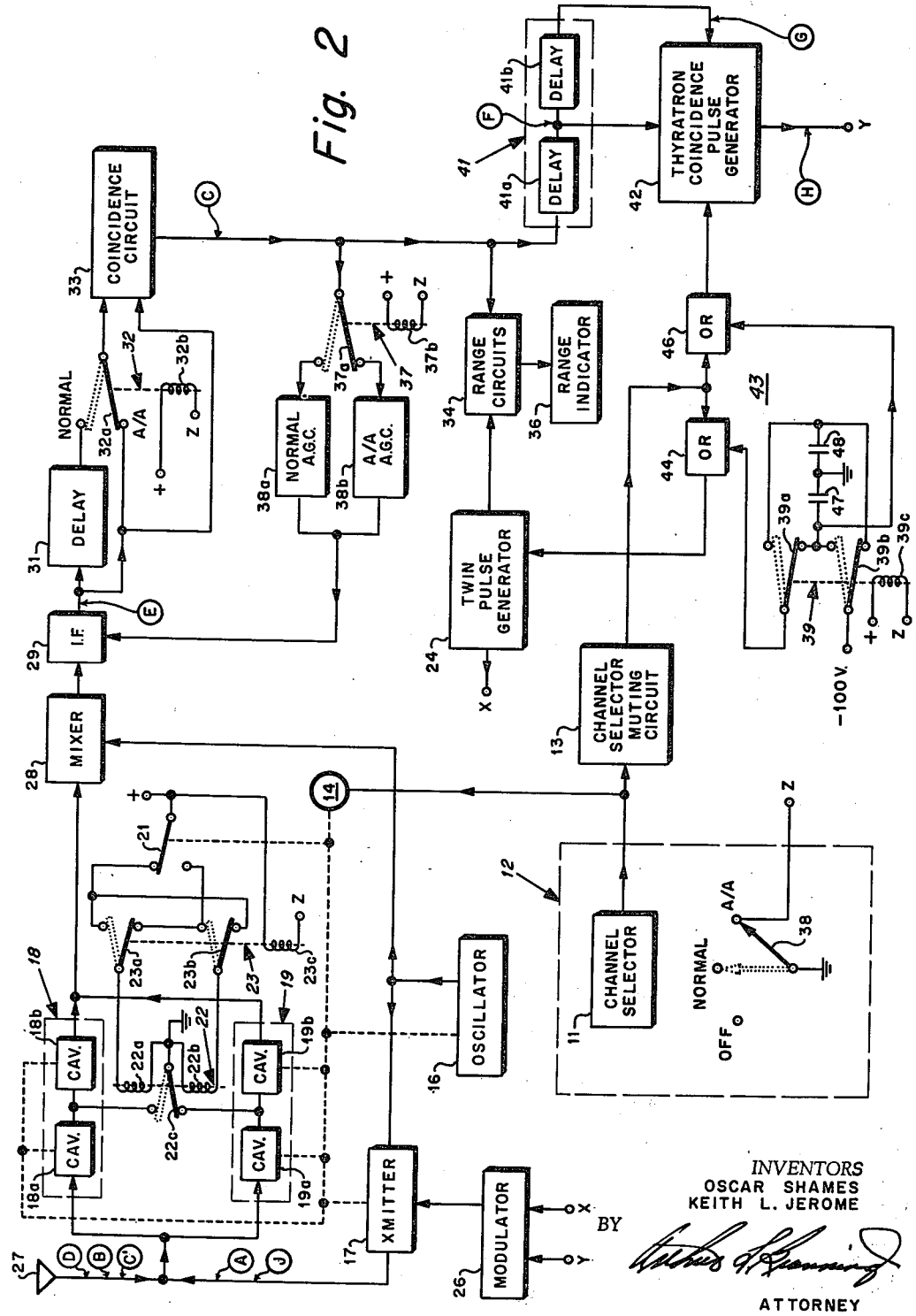

Jan. 29, 1963  O. SHAMES ET AL  3,076,190
AIR-TO-AIR RANGING SYSTEM
Filed June 30, 1960  4 Sheets-Sheet 3

INVENTORS
OSCAR SHAMES
KEITH L. JEROME
BY
ATTORNEY

United States Patent Office

3,076,190
Patented Jan. 29, 1963

3,076,190
AIR-TO-AIR RANGING SYSTEM
Oscar Shames, 1652 E. Walnut Lane, Philadelphia, Pa., and Keith L. Jerome, County Line Road and Fairmont Ave., Chalfont, Pa.
Filed June 30, 1960, Ser. No. 40,120
13 Claims. (Cl. 343—6.5)
(Granted under Title 35, U.S. Code (1952), sec. 266)

The invention described herein may be manufactured and used by or for the Government of the United States of America for governmental purposes without the payment of any royalties thereon or therefor.

The present invention, in a contemplated use thereof, relates to an air-to-air ranging system and preferably to a bilateral air-to-air ranging system which may be implemented by modification of the airborne equipment utilized in the TACAN range and azimuth system.

For many purposes such as station keeping, in-flight refueling, collision avoidance, and maintaance of adequate separation between aircraft in controlled airspace, there has for some time existed a need for a simple, reliable, bilateral air-to-air ranging system which may be implemented without incurring the weight penalty attendant to the installation in an aircraft of additional specialized equipment. A number of systems are known to the art which are capable of operation to provide an air-to-air ranging function. Known systems, however, are characterized either by the disadvantage of being incapable of providing the requisite degree of reliability or accuracy or by the disadvantage of requiring the provision of additional complex and bulky equipment in the aircraft. It is well known that weight and space considerations have become the critical factors in determining the quantum of electronic apparatus which may be installed in modern aircraft. The manner in which the present invention overcomes these and other disadvantages inherent in the prior art systems will become apparent upon consideration of the description given below of illustrative embodiments thereof.

It is a principal object of the present invention to provide a bilateral air-to-air ranging function for aircraft in flight utilizing existing air-to-ground range and azimuth equipment installed in the aircraft in a manner which does not impair the normal functions of this equipment.

The present invention is primarily intended to be utilized as an air-to-air ranging system. However, the implementation thereof provides an RF link between aircraft in flight which may be utilized for any desired purpose, for example, transmission of azimuth information.

It is therefore another object of this invention to provide an RF link between aircraft in flight utilizing existing air-to-ground range and azimuth equipment installed in the aircraft whereby intelligence of any desired character may be conveyed between the aircraft.

When modified in accordance with the principles of the present invention, TACAN type airborne equipment may be employed advantageously in some ground-to-air applications, for example, in air-dropable beacons.

It is therefore still another object of the present invention to extend the capabilities of TACAN type airborne equipment by appropriate modification thereof.

Other objects and many of the attendant advantages of this invention will be readily appreciated as the same becomes better understood by reference to the following detailed description when considered in connection with the accompanying drawings wherein:

FIG. 2 is a simplified block diagram of an embodiment of the invention;

Figure 1:
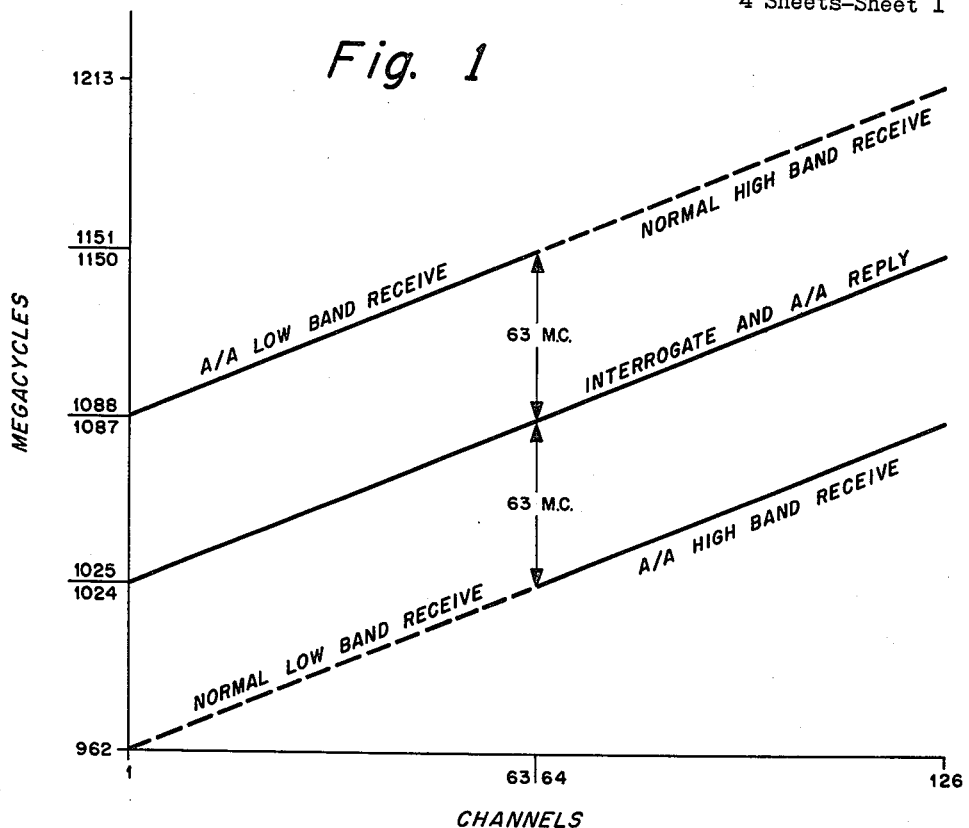
FIG. 1 is a diagram showing existing and potential frequency utilization in a TACAN system.

By reference to FIG. 1, a brief general description of the normal and air-to-air mode of operation which may be accomplished by TACAN equipment will be given.

The basic TACAN system comprises an airborne AN/ARN–21B transmitter-receiver or equivalent and an AN/URN–3 ground beacon or equivalent. To obtain range and bearing information with respect to a selected ground beacon, the airborne equipment interrogates the selected ground beacon with 12 microsecond spaced pulse pairs on any of 126 channels spaced one megacycle apart between 1025 megacycles and 1150 megacycles. The ground beacon transponds with 12 microsecond spaced pulse pairs on any of 126 corresponding channels spaced one megacycle apart between 962 megacycles and 1024 megacycles on a low band and between 1151 megacycles and 1213 megacycles on a high band. The intermediate frequency of the ARN–21B receiver portion is 63 megacycles. Accordingly, to prevent receipt by one ARN–21B of interrogating signals transmitted by another ARN–21B, each ARN–21B transmitter-receiver is tuned to receive reply pulses on a frequency displaced 63 megacycles from its associated transmitting frequency. Further, in order to provide for rejection of image frequencies, the high and low receiving bands are separated by 126 megacycles (twice the intermediate frequency). In the TACAN system, range information is obtained utilizing circuitry in the airborne equipment which functions to measure the time period which elapses between transmission of an interrogating pulse pair and receipt of a reply pulse pair. Azimuth information is conveyed by amplitude modulating the reply pulse pairs, random pulse pairs, and reference pulse pairs.

According to the invention it has been determined that with proper modification the ARN–21B transmitter-receiver can be operated on the image mode by utilizing the portion of the receiver low band between 1025 megacycles and 1087 megacycles and by utilizing the portion of the receiver high band between 1088 megacycles and 1150 megacycles, thus making available 63 pairs of one megacycle channels which may be employed to establish an air-to-air link between two or more ARN–21B transmitter-receivers. This mode of operation is alternative to the normal air-to-ground mode.

By reference to FIGS. 2 and 3, a brief further discussion will be given below relating to the normal air-to-ground mode ranging functions of the TACAN system. The azimuth functions will not be discussed. For more detailed information, reference may be made, for example, to the Handbook Service Instructions, Radio Set AN/AN–21, (Navy) AN 16–30ARN21-2, (USAF) T.O. 12R5–2ARN21-2, dated May 1, 1956 (revised 15 January 1958).

Referring now to FIG. 2, in the airborne equipment channel selection is accomplished by manipulation of a channel selector 11 in a control box 12. Operation of channel selector 11 energizes a channel selector muting circuit 13, for a purpose to be later described, and concurrently energizes a motor 14. Operation of motor 14 concurrently tunes an oscillator 16, a transmitter 17, a receiver preselector cavity structure 18, including a pair of series connected cavities 18a, 18b, which, for example, may be tunable between 1088 megacycles and 1213 megacycles, and a second receiver preselector cavity structure 19, including a pair of series connected cavities 19a, 19b, which, for example, may be tunable between 962 megacycles and 1087 megacycles. Operation of motor 14 further functions to actuate a switch 21 to selectively energize operating winding 22a or 22b of a cavity selector relay 22 through the contacts 23a or 23b of a mode selector relay 23 provided with an operating winding 23c. As shown preselector cavity 18 is rendered inoperative by being shorted through the contacts 22c of the cavity selector relay. (The normal or air-to-ground mode positions of switches and relays are shown by dotted lines in FIG. 2). It is to be understood that cavities 18, 19 may comprise a single cavity having high and low band portions separated by a normally unused portion corresponding to twice the intermediate frequency of the receiver.

At intervals a twin pulse generator 24 functions to provide pulse pairs which are applied to a modulator 26. Modulator 26 thereupon keys transmitter 17 to cause a pulse pair modulated radio frequency signal to be radiated from an antenna 27. The interrogating pulse pair is shown as waveform A in FIG. 3.

Upon receipt of an interrogating pulse pair, the ground beacon, AN/URN-3, after a 50 microsecond system delay, transponds with a pulse pair modulated radio frequency signal which is received by antenna 27. The received signal is coupled through the operative preselector cavity or cavity portion to a mixer 28.

For simplicity mixer 28 has been shown as supplied with a local oscillator signal from oscillator 16 in a conventional manner. In actual practice, the local oscillator signal is derived from transmitter 17. However, for an understanding of the present invention, it is necessary to note only that the frequency of the local oscillator signal applied to a mixer 28 is equal to the frequency of the transmitted signal.

The twin pulse reply signal from mixer 28 is coupled through an intermediate frequency circuit 29 and coupled directly and through a delay line 31 and the contacts 32a of a mode selector relay 32, provided with an operating winding 32b, to the input circuits of a decoder circuit 33 of the coincidence type. Delay line 31 introduces a phase delay equal to the interpulse period, for example, 12 microseconds. Accordingly, coincidence circuit 33 provides an output signal only when energized by a pulse pair having the proper interpulse period. The reply pulse pair and the output pulse from coincidence circuit 33 are respectively shown by waveforms B and C in FIG. 3.

It will be noted that for a zero mile range, ignoring delays occurring in the receiver circuitry, coincidence circuit 33 provides an output pulse 62 microseconds after the transmission of an interrogating pulse pair. This interval is equal to the sum of the 50 microsecond system delay in the ground beacon and the 12 microsecond interpulse period.

Continuing with the description of the air-to-ground mode of operation, the output signal from coincidence circuit 33 is coupled through appropriate amplifier and limiter circuits (not shown) to range circuits 34.

Range circuits 34 include a range tracking loop of the coherent type the operation of which is correlated to the transmission of the interrogating pulse pair by the application thereto of a synchronizing signal from twin pulse generator 24. Operation of the range track loop effectively measures the time interval between the transmission of an interrogating signal and receipt of a reply signal.

The output signal from range circuits 34 (proportional to range) is applied as an operating signal to a range indicator 36.

Automatic gain control for the receiver is provided by coupling a portion of the output signal from coincidence circuit 33 through contacts 37a of a mode selector relay 37, provided with an operating winding 37b, and through an integrating network 38a to intermediate frequency section 29 to control the gain thereof.

By way of example, it is assumed that it is desired to interrogate a ground beacon operating upon channel 1. Channel selector 11 is actuated to operate motor 14 to tune oscillator 16 and transmitter 17 to a frequency of 1025 megacycles and to tune cavity 19 to a frequency of 962 megacycles. Motor 14 further functions to tune cavity 18 to 1088 megacycles but actuation of motor operated switch 21 has energized cavity selector relay 22 to apply a short to cavity 18 thus rendering it inoperative. Upon receipt of the 1025 megacycle interrogating signal, the ground beacon transponds on 962 megacycles.

In a similar manner operation upon any of the remaining 125 channels may be accomplished. Channel selection between channels 63 and 64 causes actuation of relay 22 to remove the short from preselector cavity 18 and to apply a short to cavity 19.

Channel selector muting circuit 13 during channel selection functions to provide a cutoff bias signal to pulse generator 24 through an OR circuit 44 to prevent damage to the receiver by feed-through of spurious transmissions from transmitter 17 which might otherwise occur since operation of pulse generator 24 normally is continual.

By further reference to FIG. 2, the air-to-air mode of operation will now be described.

The embodiment of the invention shown in FIG. 2, in the air-to-air mode, utilizes twin pulse interrogations and single pulse replies. As will be more fully discussed below, operation in the air-to-air mode utilizing twin pulse replies as well as twin pulse interrogations is likewise feasible.

Manually operable switch 38 in control box 12 when actuated to the air-to-air position funtions to place a ground on the operating windings of each of the mode selector relays 23, 32, 37, and a muting circuit relay 39 energizing the operating windings and causing the contacts thereof to assume the solid line position shown in FIG. 2.

Relay 23 when energized functions to reverse the sequence in which short circuits are respectively applied to receiver preselector cavities 18, 19 with respect to the sequence encountered in the normal air-to-ground operation of the equipment.

Operation of relay 32 causes delay line 31 to be bypassed coupling both inputs of coincidence circuit 33 directly to intermediate frequency circuit 29. Circuit 33 in the air-to-air mode, as shown, functions simply as an amplifier and will therefore pass both single and twin pulse signals.

The functions of relay 37 and 39 will be later discussed.

Assuming, as before, that transmitter 17 is tuned to channel 1, 1025 megacycles, cavity 18 will be tuned to 1088 megacycles and cavity 19 will be tuned to 962 megacycles but will be shorted through the contacts of relay 22. By prearrangement or by voice or other communications the equipment in one or more other aircraft with which it is desired to establish an air-to-air link will be tuned to channel 64, that is tuned to transmit on 1088 megacycles and normally tuned to receive on 1151 megacycles. However, actuation of the air-to-air mode selector relays 22 in the other aircraft function to switch the short circuits applied to the preselector cavities in the receiver equipments thereof. Accordingly, the transmitter-receiver equipments in the other aircraft are now tuned to receive at 1025 megacycles and to transmit at 1088 megacycles. By similar analogy it may be seen that 62 additional cross paired channels may be established, that is channel 2 will pair with channel 65, channel 3 with channel 66, etc.

Utilized as an interrogator, the equipment shown in FIG. 2 may be employed to determine and display range to one or more other aircraft similarly equipped.

Twin pulse generator 24 functions in a normal manner to cause a twin pulse interrogating signal to be transmitted from transmitter 17, in the example given, at 1025 megacycles. The interrogating pulse pairs may be received by a ground beacon tuned to channel 1. The reply pulse therefrom at 962 megacycles however will be rejected since cavity 19, tuned to 962 megacycles, is now short circuited.

The transponding aircraft, however, receive the interrogating pulse pair on receiver channel 64, 1025 megacycles, and reply with a single pulse, utilizing circuitry to be described below, on transmitter channel 64, 1088 megacycles.

Figure 3:
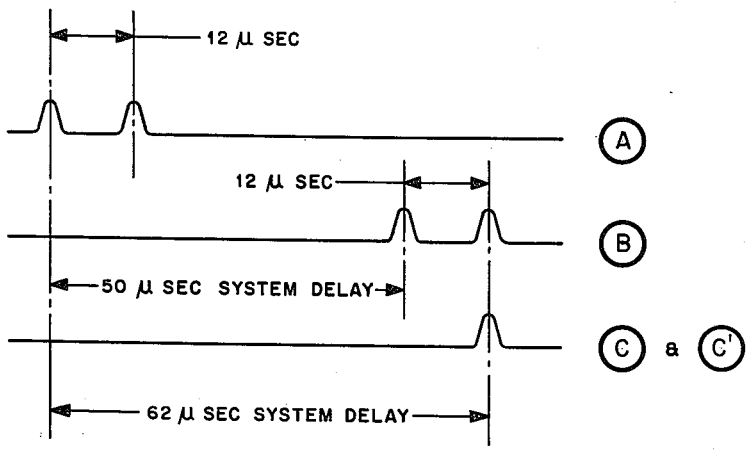
FIGS. 3 and 4 illustrate waveforms occurring in the embodiment of FIG. 2.

The interrogating pulse pair and a single pulse reply are shown by waveforms A and C' in FIG. 3.

The single pulse replies are coupled from antenna 27 through cavity 18 and applied through mixer 28, and intermediate frequency section 29 to coincidence circuit 33, now being operated simply as an amplifier. The output signal from coincidence circuit 33 is applied to range circuits 34 which thereupon function in a normal manner to cause the ranges to the transponding aircraft to be displayed upon range indicator 36.

The embodiment of FIG. 2 transponds with single pulse replies to twin pulse interrogations after a delay of, for example, 62 microseconds. The delay specified corresponds to the sum of the 50 microsecond beacon system delay and the 12 microsecond decoding delay encountered in normal air-to-ground operation, as mentioned above in the description thereof given with reference to FIG. 3. Thus no special range compensation is required to permit air-to-air ranging.

Figure 4:
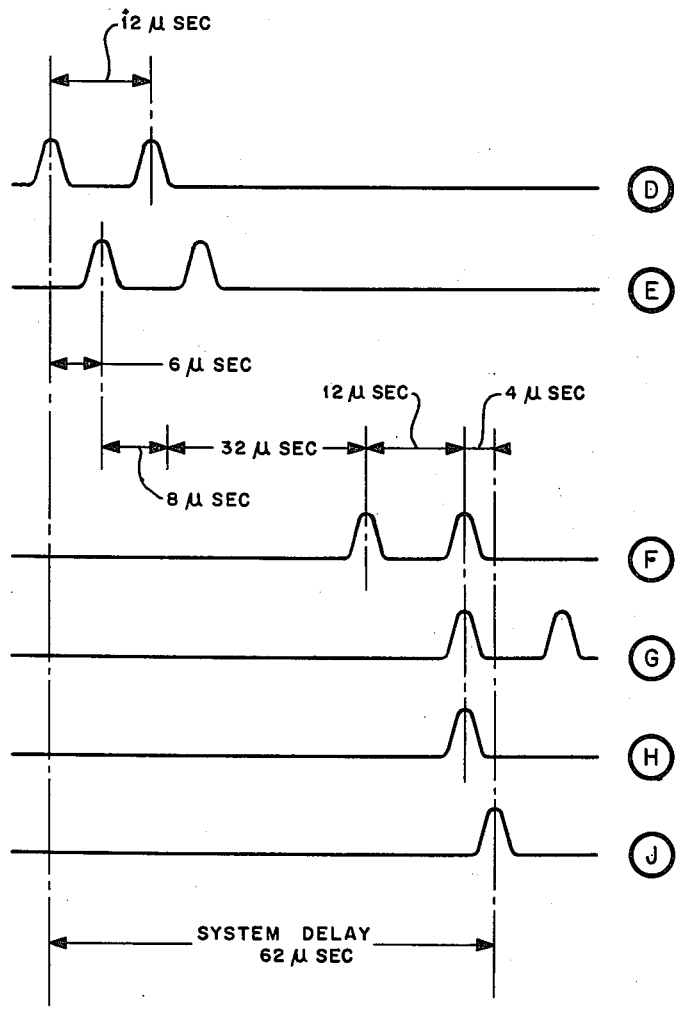

The transponding mode may be best understood by conjoint reference to FIG. 2 and the waveforms of FIG. 4.

A received interrogation pulse pair, such as shown by waveform D, is coupled from antenna 27 through cavity 18 or 19, whichever is operative, and through mixer 28 to intermediate frequency circuit 29. The signal from intermediate frequency circuit is applied directly to both inputs of coincidence circuit 33, now operated merely as an amplifier, as mentioned above.

As indicated by waveform E, the signal is delayed approximately 6 microseconds in passing through intermediate frequency circuit 29.

The output signal from coincidence circuit 33 is coupled conjointly to range circuits 34 and through amplifier and clipper circuits, not shown, to a decoding delay line 41 and applied to the input circuits of a thyratron pulse generator 42 of the coincidence type.

In passing it should be noted that range circuits 34 do not respond to interrogating pulse pairs because they are not synchronized with the range tracking circuits therein.

As shown by waveform F, the amplifier and clipper circuits and delay line portion 41a respectively introduce delays of 8 microseconds and 32 microseconds.

Delay line 41b provides an additional delay equal to the interpulse period, in this case 12 microseconds as shown by waveform G. Accordingly, as shown by waveform H, pulse generator 42 functions to provide a single pulse output signal coinciding in time with the second pulse of the pulse pair appearing at the juncture of delay line portions 41a, 41b. Thus, operation of pulse generator 42 upon single pulse replies or upon pulse pairs having other than the selected interpulse period is prevented.

The output signal from pulse generator 42 is applied to modulator 26 which keys transmitter 17, whereby, after a further 4 microsecond delay occurring in modulator 26 and transmitter 17, a single pulse reply is radiated, as indicated by waveform J.

It will be observed that, as desired, a total system delay of 62 microseconds has been provided between receipt of the interrogating pulse pair and transmission of the single pulse transponse.

While operations of the embodiment of FIG. 2 in the interrogating and transponding modes, respectively, have been separately described for convenience, it should be noted that both operations may be performed simultaneously to permit bilateral ranging. One aircraft may transpond to several interrogating aircraft, or, one aircraft may interrogate several aircraft, or several aircraft may bilaterally range upon each other. The permissible duty cycle of modulator 26 is the principal limitation on the number of aircraft to which transponses may be made while the present mechanizations of the range display is the principal limitation upon the number of aircraft which may be interrogated.

The normal automatic gain control provided by integrating network 38a will not function properly in the air-to-air mode since in the air-to-ground mode the pulse repetition rate may be 3600 PPS (the sum of reply pulse pairs, random pulse pairs, and reference pulse pairs) whereas in the air-to-air mode the pulse repetition rate may be of the order of 150 PPS or less. Accordingly, a second integrating network 38b, having a relatively longer time constant, is provided and, in the air-to-air mode, is coupled through the contacts 37a of selector relay 37 between coincidence circuit 33 and intermediate frequency circuit 29. In order to optimize the receiver operation, integrating network 38b should be adjustable in order to permit variation in the degree of automatic gain control provided thereby.

For some applications, for example where it is desired to provide ranging between widely separated aircraft, it may be desirable to operate the receiver wide open. Accordingly, for these purposes, it may be desirable to omit the automatic gain control feature. However, absent automatic gain control, false range readings may result from receipt of a reflected rather than a direct wave. It should be apparent that operating conditions will dictate whether or not and to what degree automatic gain control should be provided in the air-to-air mode.

To prevent damage to the receiver during channel selection in the air-to-air mode, the cutoff bias signal from channel selector muting circuit 13 is applied during channel selection through OR circuit 46 to pulse generator 42. Channel selection muting is thus accomplished in a manner substantially identical to that acomplished in the air-to-ground mode wherein, as mentioned above, pulse generator 24 is muted during channel selection.

In addition to the muting required during channel selection, muting is required to prevent damage from transmissions which may occur during mode selection. For this purpose a second muting circuit 43 is provided and includes a pair of capacitors 47, 48 coupled to the appropriate contacts of relay 39. When the ARN-21 is being operated in the normal or air-to-ground mode, capacitor 47 is coupled to a minus 100 volt source to be energized therefrom. Actuation of relay 39 to the air-to-air mode contact position couples capacitor 47 through relay contact 39a and OR circuit 44 to pulse generator 24 to momentarily apply a cutoff bias thereto. Capacitor 47 is further directly coupled through OR circuit 46 to pulse generator 42 for the same purpose. It may be seen that when mode selector relay 39 is energized with the contacts thereof in the air-to-air mode position, as illustrated in FIG. 2, capacitor 48 is coupled to the minus 100 volt supply to be charged therefrom. Accordingly, when the system is switched from the air-to-air mode to the normal mode, capacitor 48 is coupled through contacts 39a of relay 39 and through OR circuit 44, as before, momentarily apply a cutoff bias to pulse generator 24. At the same time, the minus 100 volt source is coupled through relay contact 39b of relay 39 and through OR circuit 46 to apply a cutoff bias to pulse generator 42 at all times except when the system is placed in the air-to-air mode of operation.

Figure 5:
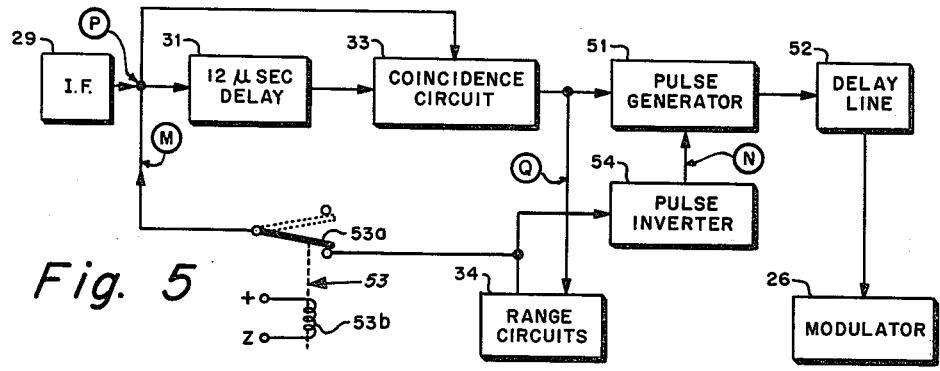
FIG. 5 is a simplified block diagram of another embodiment of the invention; and, FIG. 6 illustrates waveforms pertinent to explaining the mode of operation of the embodiment of FIG. 5.

FIG. 5 shows an embodiment of the invention wherein operation of the ARN-21B in the air-to-air mode is accomplished without modification of the normal decoder circuits.

Operation of the embodiment of FIG. 5 as a transponder is similar to the mode of operation of the embodiment shown in FIG. 2. Twin pulse interrogations from intermediate frequency section 29 are coupled directly and through delay line 31 to the input circuits of coincidence circuit 33 which functions to supply a single pulse to trigger a pulse generator 51 the output signal from which is coupled through a delay line 52 to energize modulator 26 which thereupon functions in a normal manner to key transmitter 17 to provide, for example, a single pulse reply transmitted to the interrogating aircraft. Delay line 52 is provided to introduce the required system delay.

Figure 6:
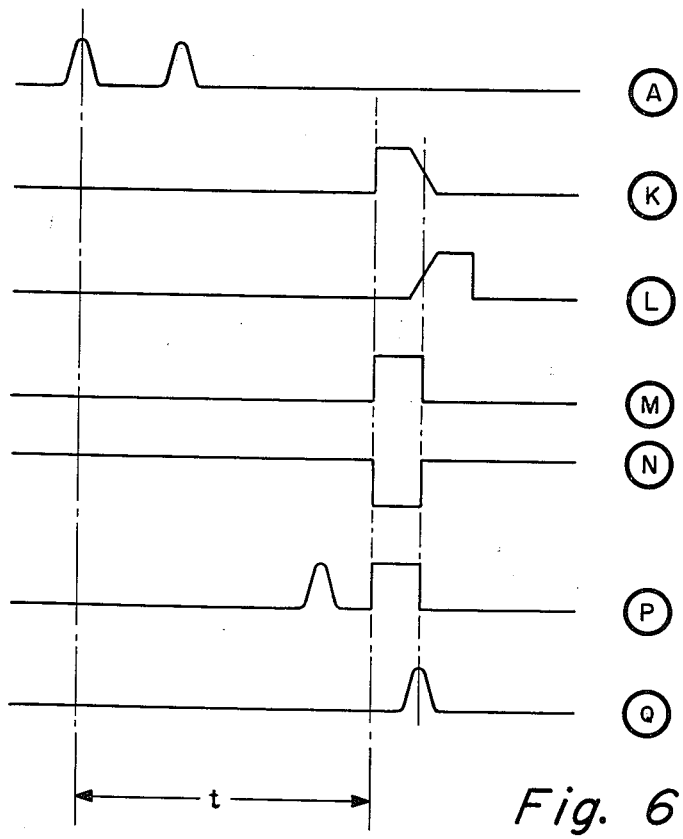

Operation of the embodiment of FIG. 5 as an interrogator may be best understood by reference to the waveforms of FIG. 6. The range tracking portions of range circuits 34 include early and late gate circuits (not shown) which provide waveforms of the character indicated at K and L, respectively, in FIG. 6. The early gate signal, waveform K, may be applied through the contacts 53a of a mode selector relay 53, provided with an operating winding 53b, to the input of delay line 31 as an enabling gate, waveform M, and, after inversion in a pulse invertor 54, as an inhibiting gate, waveform N, to pulse generator 51. The synchronization between the operation of twin pulse generator 24 and the operation of the range track servo loop is such that a single pulse reply received from a transponding aircraft and enabling gate M will be related in time (waveform P) to permit operation of coincidence circuit or decoder 33 in the same manner as the circuit would operate were a twin pulse applied thereto from intermediate frequency section 29, as in air-to-ground operation. Accordingly, coincidence circuit 33 and range circuits 34 will operate in the same manner as they do when the system is placed in the normal or air-to-ground mode of operation and the decoded reply pulse will be properly positioned in time in the range circuits intermediate the early and late gates, as shown in waveform Q.

In order to prevent pulse generator 51 from operating upon a reply pulse, the inhibiting pulse, waveform N, is coupled to the pulse generator from pulse inverter 54.

For some purposes, such as aerial refueling, it may be necessary to provide transponding capability in only one aircraft, for example, the tanker. For this and similar purposes only unilateral ranging is required. Accordingly, the airborne equipment in the interrogating aircraft need only be modified to the extent of providing for cavity switching to permit the air-to-air mode of operation. In this mode of operation display of range between the transponding aircraft and the interrogating aircraft is not required in the transponding aircraft. Accordingly, in the transponding aircraft the ARN-21B equipment need only be modified, in addition to providing for cavity switching, to the extent of disabling the range circuits thereof and providing a circuit to directly couple the output of coincidence circuit 33 to twin pulse generator 24 through existing delay lines.

Obviously many modifications and variations of the present invention are possible in the light of the above teachings. It is therefore to be understood that within the scope of the appended claims, the invention may be practiced otherwise than as specifically described.

What is claimed is:

1. In a radio receiver of the superheterodyne type, a first radio frequency tunable circuit, a second radio frequency tunable circuit, means to tune said circuits whereby they are respectively tuned to frequencies which differ from each other by twice the intermediate frequency of said receiver, means to render one of said circuits inoperative when tuned over a first frequency range, means to render the other of said circuits inoperative when tuned over a second frequency range, and means to reverse the order in which said circuits are rendered inoperative to thereby permit image mode reception in said receiver.

2. In a transmitter-receiver system: an antenna; transmitter means coupled to said antenna, said transmitter means including a modulator and a local oscillator; means operable to generate and to apply an intelligence bearing signal to said modulator; a radio receiver of the superheterodyne type including first and second radio frequency tunable circuits coupled to said antenna, a mixer coupled to said transmitter and to said radio frequency circuits, and an intermediate frequency circuit coupled to said mixer; means to tune said radio frequency circuits and said transmitter whereby said radio frequency circuits are respectively tuned to frequencies which differ from each other by twice the intermediate frequency of said receiver and said transmitter is tuned to a frequency between those to which said radio frequency circuits are tuned; means to render one of said radio frequency circuits inoperative when tuned over a first frequency range; means to render the other of said radio frequency circuits inoperative when tuned over a second frequency range; means to reverse the order in which said radio frequency circuits are rendered inoperative to thereby permit image mode reception in said receiver; and utilization means coupled to said intermediate frequency circuit.

3. The combination of claim 2 wherein said radio frequency circuits comprise cavities each including a mechanically actuated cavity tuning element coupled to a motor to be driven thereby; wherein said means to render said radio frequency circuits inoperative comprises a switch having a pair of stationary contacts, a movable contact mechanically coupled to said motor to be driven thereby, and circuit means coupling said movable contact to a voltage source; a first relay including a movable contact, a pair of stationary contacts, and a pair of operating windings each having one terminal thereof connected to a point of reference potential and each having the other terminal thereof adapted to be coupled to the stationary contacts of said switch; and circuit means to selectively short circuit said cavities through the contacts of said first relay; wherein said reversing means comprises a second relay having an operating winding adapted to be connected through a manually operable switch to a voltage source, a pair of movable contacts respectively coupled to the other terminals of the operating windings of said first relay, and two pairs of stationary contacts connected to the stationary contacts of said motor driven switch; and wherein there is further provided means to disable said transmitter during actuation of said switches and relays.

4. In a transponder system: an antenna; transmitter means coupled to said antenna and including a modulator and a local oscillator; a radio receiver of the superheterodyne type including first and second radio frequency tunable circuits coupled to said antenna, a mixer coupled to said transmitter and to said radio frequency circuits, and an intermediate frequency circuit coupled to said mixer; means coupled to be energized from said intermediate frequency circuit operable to generate and to apply an intelligence bearing signal to said modulator; means to tune said radio frequency circuits and said transmitter whereby said radio frequency circuits are respectively tuned to frequencies which differ from each other by twice the intermediate frequency of said receiver and said transmitter is tuned to a frequency between those to which said radio frequency circuits are tuned; means to render one of said radio frequency circuits inoperative when tuned over a first frequency range; means to render the other of said radio frequency circuits inoperative when tuned over a second frequency range; and means to reverse the order in which said circuits are rendered inoperative to thereby permit image mode reception in said receiver.

5. The combination of claim 4 wherein said radio frequency circuits comprise cavities each including a mechanically actuated cavity tuning element coupled to a motor to be driven thereby; wherein said means to render said radio frequency circuits inoperative comprises a switch having a pair of stationary contacts, a movable contact mechanically coupled to said motor to be driven thereby, and circuit means coupling said movable contact to a voltage source; a first relay including a movable contact, a pair of stationary contacts, and a pair of operating windings each having one terminal thereof connected to a point of reference potential and each having the other terminal thereof adapted to be coupled to the stationary contacts of said switch; and circuit means to selectively short circuit said cavities through the contacts of said first relay; wherein said reversing means comprises a second relay having an operating winding adapted to be connected through a manually operable switch to a voltage source, a pair of movable contacts respectively coupled to the other terminals of the operating windings of said first relay, and two pairs of stationary contacts connected to the stationary contacts of said motor driven switch; and wherein there is further provided means to disable said signal generator during actuation of said switches and relays.

6. The combination of claim 4 wherein there is further provided: utilization means coupled to said intermediate frequency circuit.

7. The combination of claim 6 wherein said radio frequency circuits comprise cavities each including a mechanically actuated cavity tuning element coupled to a motor to be driven thereby; wherein said means to render said radio frequency circuits inoperative comprises a switch having a pair of stationary contacts, a movable contact mechanically coupled to said motor to be driven thereby, and circuit means coupling said movable contact to a voltage source; a first relay including a movable contact, a pair of stationary contacts, and a pair of operating windings each having one terminal thereof connected to a point of reference potential and each having the other terminal thereof adapted to be coupled to the stationary contacts of said switch; and circuit means to selectively short circuit said cavities through the contacts of said first relay; wherein said reversing means comprises a second relay having an operating winding adapted to be connected through a manually operable switch to a voltage source, a pair of movable contacts respectively coupled to the other terminals of the operating windings of said first relay, and two pairs of stationary contacts connected to the stationary contacts of said motor driven switch; and wherein there is further provided means to disable said signal generator during actuation of said switches and relays.

8. In a radio ranging system of the transponder type utilizing pulse coded interrogations and replies, a transponder comprising: an antenna; transmitter means coupled to said antenna and including a modulator and a local oscillator; a radio receiver of the superheterodyne type including first and second radio frequency tunable circuits coupled to said antenna, a mixer coupled to said transmitter and to said radio frequency circuits; an intermediate frequency circuit coupled to said mixer; a decoder coupled to said intermediate frequency circuit; transponding pulse generating means having an input circuit coupled to said decoder and an output circuit coupled to said modulator; means to tune said radio frequency circuits and said transmitter whereby said radio frequency circuits are respectively tuned to frequencies which differ from each other by twice the intermediate frequency of said receiver and said transmitter is tuned to a frequency between those to which said radio frequency circuits are tuned; means to render one of said radio frequency circuits inoperative when tuned over a first frequency range; means to render the other of said radio frequency circuits inoperative when tuned over a second frequency range; and means to reverse the order in which said circuits are rendered inoperative to thereby permit image mode reception in said receiver.

9. The combination of claim 8 wherein said radio frequency circuits comprise cavities each including a mechanically actuated cavity tuning element coupled to a motor to be driven thereby; wherein said means to render said radio frequency circuits inoperative comprises a switch having a pair of stationary contacts, a movable contact mechanically coupled to said motor to be driven thereby, and circuit means coupling said movable contact to a voltage source; a first relay including a movable contact, a pair of stationary contacts, and a pair of operating windings each having one terminal thereof connected to a point of reference potential and each having the other terminal thereof adapted to be coupled to the stationary contacts of said switch; and circuit means to short circuit said cavities through the contacts of said first relay; wherein said reversing means comprises a second relay having an operating winding adapted to be connected through a manually operable switch to a voltage source, a pair of movable contacts respectively coupled to the other terminals of the operating windings of said first relay, and two pairs of stationary contacts connected to the stationary contacts of said motor driven switch; and wherein there is further provided means to disable said pulse generating means during actuation of said switches and relays.

10. In a radio ranging system of the transponder type utilizing pulse coded interrogations and replies, a transmitter-receiver comprising: an antenna; transmitter means coupled to said antenna and including a modulator and a local oscillator; means operable to generate and apply to said modulator a pulse coded interrogation signal; a radio receiver of the superheterodyne type including first and second radio frequency tunable circuits coupled to said antenna, a mixer coupled to said transmitter and to said radio frequency circuits, and an intermediate frequency circuit coupled to said mixer; means to tune said radio frequency circuits and said transmitter whereby said radio frequency circuits are respectively tuned to frequencies which differ from each other by twice the intermediate frequency of said receiver and said transmitter is tuned to a frequency between those to which said radio frequency circuits are tuned; means to render one of said radio frequency circuits inoperative when tuned over a first frequency range; means to render the other of said radio frequency circuits inoperative when tuned over a second frequency range; means to reverse the order in which said circuits are rendered inoperative to thereby permit image mode reception in said receiver; a decoder coupled to said intermediate frequency circuit; and a range measuring circuit coupled to said pulse generator and to said decoder.

11. The combination of claim 10 wherein said radio frequency circuits comprise cavities each including a mechanically actuated cavity tuning element coupled to a motor to be driven thereby; wherein said means to render said radio frequency circuits inoperative comprises a switch having a pair of stationary contacts, a movable contact mechanically coupled to said motor to be driven thereby, and circuit means coupling said movable contact to a voltage source; a first relay including a movable contact, a pair of stationary contacts, and a pair of operating windings each having one terminal thereof connected to a point of reference potential and each having the other terminal thereof adapted to be coupled to the stationary contacts of said switch; and circuit means to selectively short circuit said cavities through the contacts of said first relay; wherein said reversing means comprising a second relay having an operating winding adapted to be connected through a manually operable switch to a voltage source, a pair of movable contacts respectively coupled to the other terminals of the operating windings of said first relay, and two pairs of stationary contacts connected to the stationary contacts of said motor driven switch; and wherein there is further provided means to disabled said interrogation signal generator during actuation of said switches and relays.

12. In a radio ranging system of the transponder type utilizing pulse coded interrogations and replies, a transmitter-receiver comprising: an antenna; transmitter means coupled to said antenna and including a modulator and a local oscillator; first signal generating means coupled to said modulator and operable to generate a pulse coded interrogating signal; a radio receiver of the superheterodyne type including first and second radio frequency tunable circuits coupled to said antenna, a mixer coupled to said transmitter and to said radio frequency circuits, and an intermediate frequency circuit coupled to said mixer; range measuring means coupled to said intermediate frequency circuit and to said first signal generating means; second signal generating means coupled to said intermediate frequency circuit and to said modulator and operable to generate a pulse coded reply signal; means to tune said radio frequency circuits and said transmitter whereby said radio frequency circuits are respectively tuned to frequencies which differ from each other by twice the intermediate frequency of said receiver and said transmitter is tuned to a frequency between those to which said radio frequency circuits are tuned; means to render one of said radio frequency circuits inoperative when tuned over a first frequency range; means to render the other of said radio frequency circuits inoperative when tuned over a second frequency range; means to reverse the order in which said circuits are rendered inoperative to thereby permit image mode reception in said receiver.

13. The combination of claim 12 wherein said radio frequency circuits comprise cavities each including a mechanically actuated cavity tuning element coupled to a motor to be driven thereby; wherein said means to render said radio frequency circuits inoperative comprises a switch having a pair of stationary contacts, and a movable contact mechanically coupled to said motor to be driven thereby, and circuit means coupling said movable contact to a voltage source; a first relay including a movable contact, a pair of stationary contacts, and a pair of operating windings each having one terminal thereof connected to a point of reference potential and each having the other terminal thereof adapted to be coupled to the stationary contacts of said switch; and circuit means to selectively short circuit said cavities through the contacts of said first relay; wherein said reversing means comprises a second relay having an operating winding adapted to be connected through a manually operable switch to a voltage source, a pair of movable contacts respectively coupled to the other terminals of the operating windings of said first relay, and two pairs of stationary contacts connected to the stationary contacts of said motor driven switch; and wherein there is further provided means to disable said first and second signal generating means during actuation of said switches and relays.

No references cited.